(12) United States Patent
Zhou

(10) Patent No.: US 9,287,697 B2
(45) Date of Patent: Mar. 15, 2016

(54) POWER SUPPLY CIRCUIT

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting(Shenzhen)Co.,Ltd., Shenzhen (CN)

( * ) Notice: Subject to any disclaimer, the term of this patent is extended or adjusted under 35 U.S.C. 154(b) by 243 days.

(21) Appl. No.: 14/142,915

(22) Filed: Dec. 29, 2013

(65) Prior Publication Data
US 2015/0188304 A1 Jul. 2, 2015

(30) Foreign Application Priority Data

Dec. 29, 2012 (CN) .................. 2012 1 05888072

(51) Int. Cl.
*H02M 3/20* (2006.01)
*H02H 3/20* (2006.01)
*H02M 1/08* (2006.01)
*H02M 1/00* (2007.01)

(52) U.S. Cl.
CPC . *H02H 3/20* (2013.01); *H02M 1/08* (2013.01); *H02M 2001/0003* (2013.01); *Y10T 307/858* (2015.04)

(58) Field of Classification Search
CPC .......... H02M 1/36; H02M 1/32; H02M 3/20; H02M 2001/0032; G06F 1/26
See application file for complete search history.

(56) References Cited

U.S. PATENT DOCUMENTS

| | | | | |
|---|---|---|---|---|
| 3,378,758 A * | 4/1968 | Goodenow | ......... | H02M 3/1563 323/289 |
| 3,522,510 A * | 8/1970 | Cameron | ............ | H02M 3/3155 363/20 |
| 4,278,930 A * | 7/1981 | Rogers | ..................... | G01R 1/28 323/277 |
| 4,543,522 A * | 9/1985 | Moreau | ..................... | G05F 1/59 307/44 |
| 4,710,859 A * | 12/1987 | Rilly | ..................... | H02M 3/338 363/21.12 |
| 5,949,222 A * | 9/1999 | Buono | ................ | H02M 3/1563 323/222 |
| 6,239,585 B1 * | 5/2001 | Buono | ................ | H02M 3/1563 323/282 |
| 2003/0112568 A1 * | 6/2003 | Holt | ..................... | H02M 3/1588 361/91.1 |
| 2010/0211811 A1 * | 8/2010 | Zhou | ........................ | G06F 1/26 713/330 |
| 2011/0068760 A1 * | 3/2011 | Zhou | ........................ | G06F 1/26 323/282 |
| 2011/0310522 A1 * | 12/2011 | Zhou | ........................ | G06F 1/206 361/103 |
| 2013/0069633 A1 * | 3/2013 | Tu | ........................ | G01P 3/4805 324/163 |
| 2013/0088832 A1 * | 4/2013 | Li | ........................ | H02H 5/042 361/679.48 |

(Continued)

*Primary Examiner* — Timothy J Dole
*Assistant Examiner* — Yusef Ahmed
(74) *Attorney, Agent, or Firm* — Novak Druce Connolly Bove + Quigg LLP

(57) ABSTRACT

A protection circuit includes a voltage conversion unit, a voltage clamping unit, and a power supply. The voltage conversion unit converts a first voltage from the power supply into a second voltage and outputs the second voltage to an electronic element. The voltage clamping unit stops the power supply from operating if the second voltage is greater than a rated voltage of the electronic element.

8 Claims, 2 Drawing Sheets

(56) References Cited

U.S. PATENT DOCUMENTS

| | | | | |
|---|---|---|---|---|
| 2013/0128404 A1* | 5/2013 | Tu | H02H 3/202 | 361/86 |
| 2013/0154722 A1* | 6/2013 | Zhou | H03K 5/2481 | 327/540 |
| 2013/0300212 A1* | 11/2013 | Chen | H03K 17/00 | 307/113 |
| 2014/0253022 A1* | 9/2014 | Zhou | H02J 7/022 | 320/107 |
| 2014/0268466 A1* | 9/2014 | Zhou | H02H 5/043 | 361/106 |
| 2015/0084605 A1* | 3/2015 | Ho | G01R 19/175 | 323/235 |
| 2015/0084613 A1* | 3/2015 | Ho | H02M 3/1588 | 323/299 |
| 2015/0229210 A1* | 8/2015 | Takada | H02M 3/156 | 323/284 |

* cited by examiner

POWER SUPPLY CIRCUIT

BACKGROUND

1. Technical Field

The present disclosure relates to a power supply circuit.

2. Description of Related Art

Central processing units (CPUs) are expensive and important components of electronic devices. However, a high input voltage can damage the CPU.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
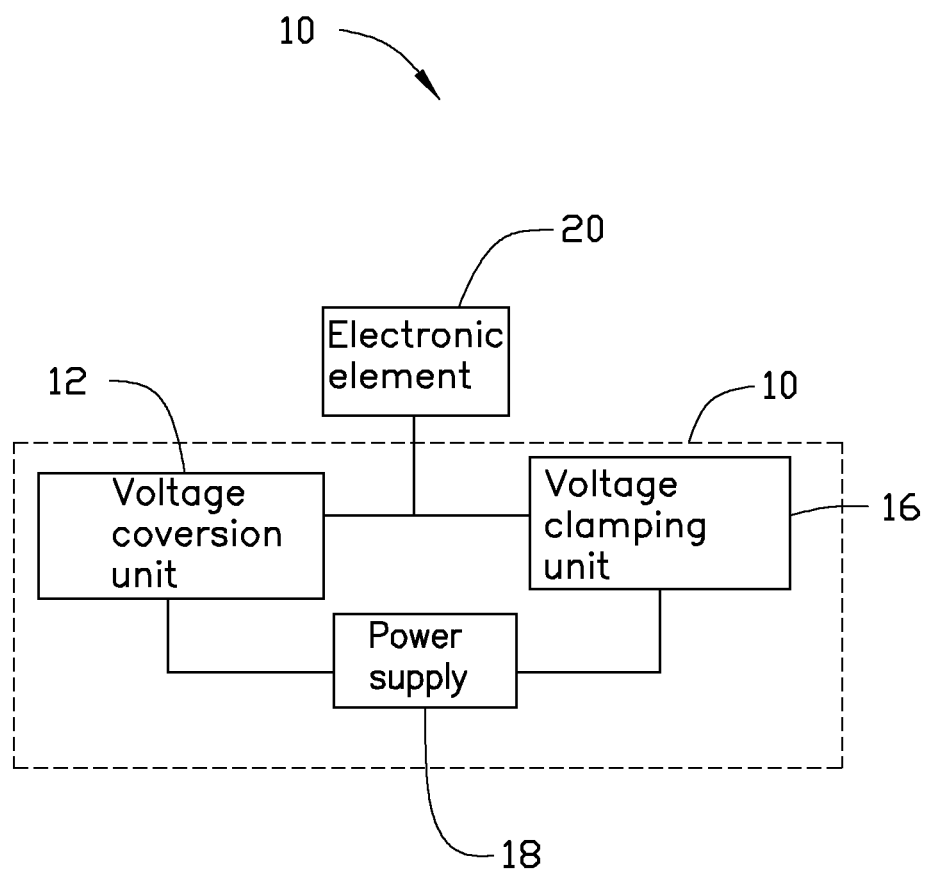
FIG. 1 is a block diagram of an embodiment of a power supply circuit.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

FIG. 1 shows an embodiment of a power supply circuit 10. The power supply circuit 10 supplies power for an electronic element 20. In one embodiment, the power supply circuit 10 comprises a voltage conversion unit 12, a voltage clamping unit 16, and a power supply 18. The voltage conversion unit 12 is electrically connected to the voltage clamping unit 16 and the electronic element 20. The power supply 18 is electrically connected to the voltage conversion unit 12 and the voltage clamping unit 16. The voltage conversion unit 12 is used to convert a first voltage from the power supply 18 into a second voltage, and output the second voltage through an output for the electronic element 20. If the second voltage is greater than a rated voltage of the electronic element 20, the voltage clamping unit 16 stops operation of the power supply 18 to protect the electronic element 20. In the embodiment, the protection circuit 10 is located on a motherboard. The electronic element 20 is a central processing unit (CPU). The power supply 18 supplies the power for the motherboard.

Figure 2:
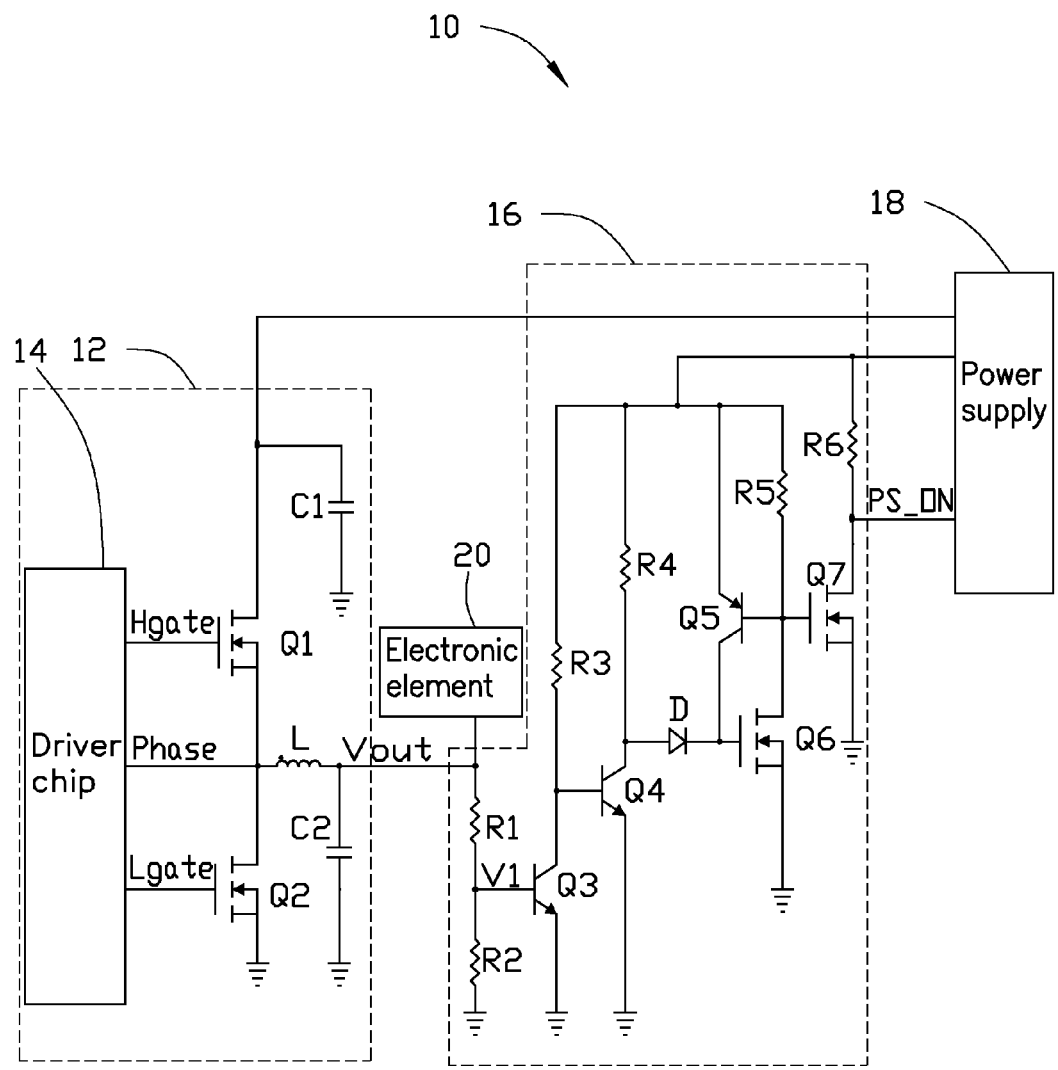
FIG. 2 is a circuit diagram of the power supply circuit of FIG. 1.

Referring to FIG. 2, the voltage conversion unit 12 comprises a driver chip 14, two metal-oxide-semiconductor field-effect transistors (MOSFETs) Q1 and Q2 functioning as electronic switches, an inductor L, and two capacitors C1 and C2. A gate of the MOSFET Q1 is electrically connected to an output pin Hgate of the driver chip 14. A drain of the MOSFET Q1 functioning as an input of the voltage conversion unit 12 is electrically connected to the power supply 18 to receive the first voltage from the power supply 18. In the embodiment, the first voltage is about 12 volts (V). The drain of the MOSFET Q1 is grounded through the capacitor C1. A source of the MOSFET Q1 is grounded through the inductor L and the capacitor C2 in that order. A gate of the MOSFET Q2 is electrically connected to an output pin Lgate of the driver chip 14. A drain of the MOSFET Q2 is electrically connected to the source of the MOSFET Q1 and an output pin Phase of the driver chip 14. A source of the MOSFET Q2 is grounded. A node between the inductor L and the capacitor C2 is electrically connected to the electronic element 20. The node between the inductor L and the capacitor C2 functions as an output of the voltage conversion unit 12

The voltage clamping unit 16 comprises three BJT transistors Q3 through Q5, two MOSFETs Q6 and Q7, a diode D, and six resistors R1-R6. A base of the BJT transistor Q3 is electrically connected to the output of the voltage conversion unit 12 through the resistor R1. The base of the BJT transistor Q3 is also grounded through the resistor R2. A collector of the BJT transistor Q3 is electrically connected to the power supply 18 through the resistor R3 to receive a second voltage from the power supply 18. In the embodiment, the second voltage is about 5V. An emitter of the BJT transistor Q3 is grounded. A base of the BJT transistor Q4 is electrically connected to the collector of the BJT transistor Q3. A collector of the BJT transistor Q4 is electrically connected to the power supply 18 through the resistor R4 to receive the second voltage. An emitter of the BJT transistor Q4 is grounded. A base of the BJT transistor Q5 is electrically connected to the power supply 18 through the resistor R5 to receive the second voltage. A collector of the BJT transistor Q5 is electrically connected to a cathode of the diode D. An emitter of the BJT transistor Q5 is electrically connected to the power supply 18 to receive the second voltage. A gate of the MOSFET Q6 is electrically connected to the collector of the BJT transistor Q5. A drain of the MOSFET Q6 is electrically connected to the base of the BJT transistor Q5. A source of the MOSFET Q6 is grounded. A gate of the MOSFET Q7 is electrically connected to the drain of the MOSFET Q6. A drain of the MOSFET Q7 is electrically connected to the power supply 18 through the resistor R6 to receive the second voltage. The drain of the MOSFET Q7 is also electrically connected to a signal pin PS_ON of the power supply 18. A source of the MOSFET Q7 is grounded.

In the embodiment, the MOSFETs Q1, Q2, Q6, and Q7 are n-channel MOSFETs, and the BJT transistors Q3 and Q4 are npn-type BJT transistors. The BJT transistor Q5 is a pnp-type BJT transistor. A resistance of the resistor R1 is represented as r1. A resistance of the resistor R2 is represented as r2. A voltage from the output of the voltage conversion unit 12 is represented as Vout. A voltage received by the base of the BJT transistor Q3 is represented as V1, and V1 satisfies a formula: $V_1 = V_{out} \times r2/(r1+r2)$. In other embodiments, npn-BJT transistors are used to replace the MOSFETs Q1, Q2, Q6 and Q7, n-channel MOSFETs are used to replace the BJT transistors Q3 and Q4, and a p-channel MOSFET is used to replace the BJT transistor Q5. The transistors Q1-Q7 function as electronic switches.

The driver chip 14 outputs high-level signals alternately through the output pin Hgate and the output pin Lgate, and the MOSFETs Q1 and Q2 are turned on, respectively. When high-level signals, such as logic 1, are output through the output pin Hgate, and low-level signals, such as logic 0, are output through the output pin Lgate, the MOSFET Q1 is turned on, and the first voltage filtered by the capacitor C1 charges the inductor L and the capacitor C2. When high-level signals are output through the output pin Lgate, and low-level signals are output through the output pin Hgate, the MOSFET Q2 is turned on, and the inductor L and the capacitor C2 are discharged through the MOSFET Q2. The voltage Vout is output through the output of the voltage conversion unit 12.

The voltage Vout is substantially equal to a rated voltage of the electronic element 20. When some elements of the motherboard operate abnormally, the voltage Vout can be greater than the rated voltage of the electronic element 20.

According to the formula: $V_1 = Vout \times r2/(r1+r2)$, when the voltage Vout is equal to the rated voltage of the electronic element 20, the voltage V1 of the base of the BJT transistor Q3 is not great enough to turn on the BJT transistor Q3, so the BJT transistor Q3 is turned off. Thus, the base of the BJT transistor Q4 receives a high-level signal from the collector of the BJT transistor Q3, and the BJT transistor Q4 is turned on. The diode D and the MOSFET Q6 are turned off. The base of the BJT transistor Q5 and the gate of the MOSFET Q7 receive a high-level signal from the drain of the MOSFET Q6. The BJT transistor Q5 is turned off, and the MOSFET Q7 is turned on. Thus, a low-level signal is output through the drain of the MOSFET Q7 to the signal pin PS_ON of the power supply 18. The power supply 18 receives the low-level signal and operates normally.

When the voltage Vout is greater than the rated voltage of the electronic element 20, the voltage V1 of the base of the BJT transistor Q3 is great enough to turn on the BJT transistor Q3. Thus, the base of the BJT transistor Q4 receives a low-level signal from the collector of the BJT transistor Q3, and the BJT transistor Q4 is turned off. Consequently, the diode D and the MOSFET Q6 are turned on, so the base of the BJT transistor Q5 and the gate of the MOSFET Q7 receive a low-level signal from the drain of the MOSFET Q6. The BJT transistor Q5 is turned on, and the MOSFET Q7 is turned off. The signal pin PS ON receives a high-level signal from the drain of the MOSFET Q7. Thus, the power supply 18 stops operating.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A power supply circuit to supply power to an electronic element, comprising a voltage clamping unit and a voltage conversion unit, the voltage conversion unit comprising an input terminal connected to a power supply to receive a first voltage, and an output terminal connected to the electronic element, the voltage clamping unit comprising first to fifth electronic switches, first to sixth resistors, and a diode, wherein a first terminal of the first electronic switch is connected to the output of the voltage conversion unit through the first resistor and is grounded through the second resistor, a second terminal of the first electronic switch is connected to the power supply to receive a second voltage, a first terminal of the second electronic switch is connected to the second terminal of the first electronic switch, a second terminal of the second electronic switch is connected to the power supply to receive the second voltage through the fourth resistor, a first terminal of the third electronic switch is connected to the power supply to receive the second voltage through the fifth resistor, a second terminal of the third electronic switch is connected to a cathode of the diode, a third terminal of the third electronic switch is connected to the power supply to receive the second voltage, an anode of the diode is connected to the second terminal of the second electronic switch, a first terminal of the fourth electronic switch is connected to the cathode of the diode, a second terminal of the fourth electronic switch is connected to the first terminal of the third electronic switch, a first terminal of the fifth electronic switch is connected to the second terminal of the fourth electronic switch, a second terminal of the fifth electronic switch is connected to the power supply through the sixth resistor to receive the second voltage, the second terminal of the fifth electronic switch is also connected to a signal pin of the power supply, third terminals of the first, the second, the fourth, and the fifth electronic switches are grounded;

wherein when a voltage output from the voltage conversion unit is equal to a rated voltage of the electronic element, the first electronic switch is off, the second electronic switch is on, the diode, the fourth electronic switch, and the third electronic switch are off, the fifth electronic switch is on, the second terminal of the fifth electronic switch transmits a low level signal to the signal pin of the power supply, and the power supply operates normally;

wherein when the voltage output from the voltage conversion unit is greater than the rated voltage of the electronic element, the first electronic switch is on, the second electronic switch is off, the diode, the fourth electronic switch, and the third electronic switch are on, the fifth electronic switch is off, the second terminal of the fifth electronic switch transmits a high level signal to the signal pin of the power supply, and the power supply stops operating.

2. The power supply circuit of claim 1, wherein the voltage conversion unit comprises a driver chip, a sixth electronic switch, a seventh electronic switch, an inductor, and a first capacitor, a first terminal of the sixth electronic switch is connected to a first pin of the driver chip, a second terminal of the sixth electronic switch functions as the input terminal of the voltage conversion unit, a third terminal of the sixth electronic switch is grounded through the inductor and the first capacitor in that order, a first terminal of the seventh electronic switch is connected to a second pin of the driver chip, a second terminal of the seventh electronic switch is connected to a third terminal of the sixth electronic switch and a third pin of the driver chip, a third terminal of the seventh electronic switch is grounded, and a node between the inductor and the first capacitor functions as the output terminal of the voltage conversion unit.

3. The power supply circuit of claim 2, wherein the driver chip outputs high level signals through the first pin and the second pin alternately and the sixth electronic switch and the seventh electronic switch are turned on correspondingly; when the high level signals are output through the first pin, the sixth electronic switch is turned on, and the first voltage charges the inductor and the first capacitor; when the high level signal are output through the second pin, the seventh electronic switch is turned on, and the inductor and the first capacitor discharge.

4. The power supply circuit of claim 3, wherein the sixth and seventh electronic switches are n-channel metal-oxide-semiconductor field effect transistors (MOSFETs), and the first, second, and third terminals of the electronic switches are gates, drains, and sources of the MOSFETs, respectively.

5. The power supply circuit of claim 2, wherein the voltage conversion unit further comprises a second capacitor, and the second terminal of the sixth electronic switch is grounded through the second capacitor.

6. The power supply circuit of claim 1, wherein the first and second electronic switches are npn bipolar junction transistors.

7. The power supply circuit of claim 1, wherein the third electronic switch is a pnp bipolar junction transistor.

8. The power supply circuit of claim 1, wherein the fourth and fifth electronic switches are n-channel MOSFETs.

* * * * *